2 Sheets—Sheet 1.
A. C. HALLAM & J. W. McKEE.
SPRING-MOTOR.
No. 6,740. Reissued Nov. 16, 1875.
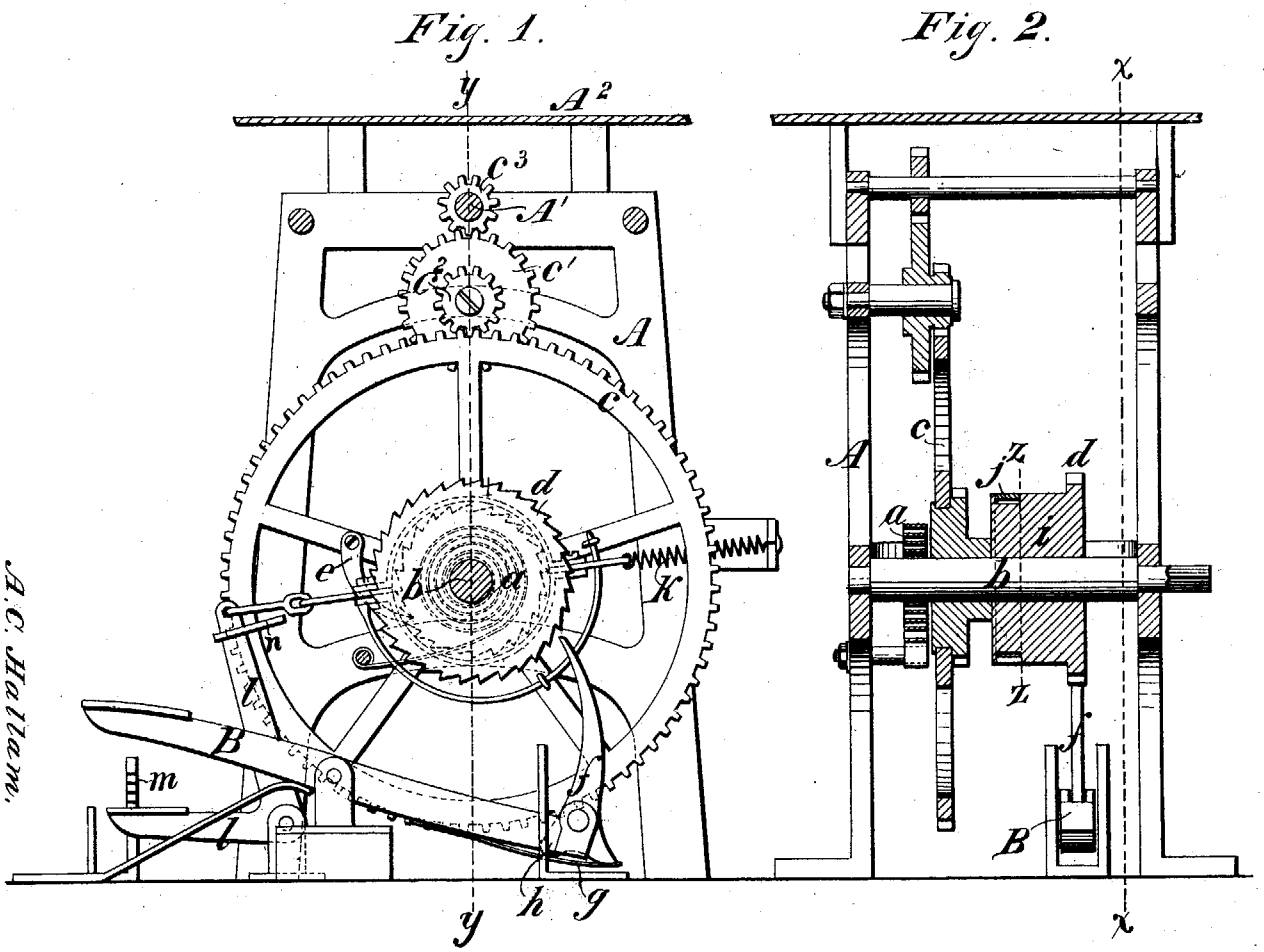
A. C. Hallam,
J. W. McKee. INVENTORS
WITNESSES
Wm A. Skinkle
Baltis DeLong
By their Attorney Marcus S. Hopkins
N. PETERS, PHOTO-LITHOGRAPHER, WASHINGTON, D. C.

185. MOTORS,
Spring,
29 Winding.

Examiner

2 Sheets—Sheet 2.

A. C. HALLAM & J. W. McKEE.

SPRING-MOTOR.

No. 6,740. Reissued Nov. 16, 1875.

WITNESSES

Wm A Skinkle

Baltis DeLong

A C Hallam

J W McKee INVENTORS

By their Attorney Marcus B Hopkins

N. PETERS, PHOTO-LITHOGRAPHER, WASHINGTON, D. C.

BEST AVAILABLE COPY BEST AVAILABLE C

UNITED STATES PATENT OFFICE.

ALBERT C. HALLAM AND JAMES W. McKEE, OF BROOKLYN, N. Y., ASSIGNORS, BY MESNE ASSIGNMENTS, TO GEORGE W. MANSON, OF LEWISTON, ME.

IMPROVEMENT IN SPRING-MOTORS.

Specification forming part of Letters Patent No. 99,669, dated February 8, 1870; reissue No. 6,740, dated November 16, 1875; application filed November 5, 1875.

*To all whom it may concern:*

Be it known that we, ALBERT C. HALLAM and JAMES W. McKEE, both of the city of Brooklyn, in the county of Kings and State of New York, have invented a new and Improved Spring-Power, particularly applicable to sewing-machines; and we hereby declare that the following is a full, clear, and exact description of the same, reference being had to the accompanying drawing, forming part of this specification, in which—

Figure 3:
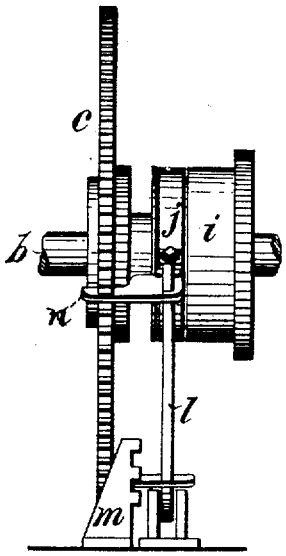

Figure 1 is a longitudinal vertical section through the frame of a sewing-machine, on the plane of the line *x x*, Fig. 2, disclosing a side elevation of our invention. Fig. 2 is a longitudinal section of our invention, taken on the plane of the line *y y*, Fig. 1. Fig. 3 is a detached end view of the brake mechanism. Fig. is a detached section of said brake mechanism, taken on the plane of the line *z z*, Fig. 2. Similar letters refer to like parts in the several figures.

This invention relates to an improved spring-power, particularly applicable for driving a sewing-machine, or for operating other light machines in which a treadle and winding mechanism may be applicable.

The treadle is here shown connected to the winding mechanism by means of a ratchet-wheel and spring-pawl, the spring-pawl being so constructed and arranged that it will, when not in actual use, immediately disengage itself from the ratchet-wheel, and remain in position to be instantly engaged therewith. Thus the operation of winding up or renewing the driving or moving power can be effected by the foot at any moment, and with very slight exertion on the part of the operator. To such end our invention consists in the combination, with the winding gear of a spring-power, of a foot-lever, so arranged and operating that the winding up or renewing of the power may be effected quickly and easily in a sewing-machine or other mechanism which is being driven by our improved spring-power. It also consists in the combination, with an actuating-spring and a gear or driving wheel, of a shaft, a friction-strap, drum, and foot-lever, whereby the speed of the gear or driving wheel can be regulated as desired, or its revolution totally stopped by means of the foot. It also consists in the combination of a pawl, provided with a heel operating as a stop, with a spring, whereby we produce a pawl or detent of a novel construction.

We have shown our spring-power as applied to the frame of a sewing-machine, A designating such frame, $A^1$ the driving-shaft of the sewing-machine, and $A^2$ the cloth-plate thereof. The main shaft *b* of the spring-power has its bearings in the frame A, and upon this shaft a cog-wheel, *c*, is mounted, which cog-wheel serves to transmit the power to the mechanism to be driven. We will, however, remark that a belt-wheel may be substituted for the cog-wheel in some cases, as is obvious. In the instance shown a cog-wheel, $c^1$, carrying a small cog-wheel, $c^2$, is arranged on a shaft mounted in said frame A, the cog-wheel $c^2$ meshing with the cog-wheel *c*, and the wheel $c^1$ with another cog-wheel, $c^3$, on the driving-shaft $A^1$ of the sewing-machine. The said spring and shaft are provided with ordinary winding-gear, consisting, as here shown, principally of a ratchet-wheel, *d*, and click or pawl *e*, the shaft *b* being provided with a square end, so that the winding up of the spring can be effected by means of a key or winch applied to such square end, as will be clearly understood by reference to Fig. 2.

Figure 4:
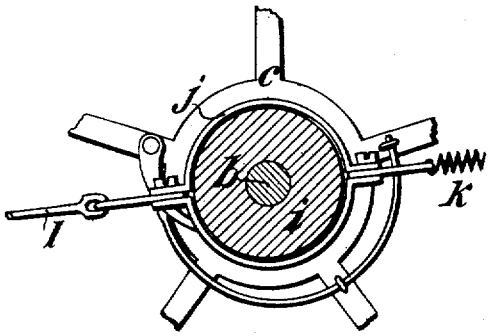

In operating a sewing-machine, for instance, by a spring-power wound up by hand, as above stated, the power of the spring may become exhausted at a time when it is inconvenient or impracticable for the operator to leave the work to wind up the spring. We provide a means for entirely overcoming this difficulty. With the ratchet-wheel *d* we have combined a treadle, B, and spring-pawl, *f*, in such manner that pressure of the foot upon the treadle will turn the shaft *b* at any moment, and the spring-power can thus be kept wound up in an operative condition as long as desired. The pawl *f* is thrown toward the ratchet-wheel *d* by the action of a spring, *g*, bearing on its heel, and from said heel projects a stop, *h*, which prevents the pawl from being thrown toward the ratchet-wheel any farther than necessary,

BEST AVAILABLE COPY or coming in contact therewith when the treadle is released from pressure of the foot. Said stop *h* also prevents the pawl being thrown in such position that it will fail to act properly on the ratchet-wheel for turning the same. On the shaft *b* is mounted a drum, *i*, which is subjected to the action of a friction strap or band, *j*. This strap embraces the drum, as shown in Fig. 4, and it connects on one side with a spring, *k*, and on the opposite side with a foot-lever, *l*. If no power is applied to said lever *l*, the spring *k* pulls the friction-strap up against the periphery of the drum, and the motion of the spring-power is checked.

By applying power to the lever *l* the force of the spring *k* can be balanced, and the strap brought in such position as to release the drum *i*, and the motion of the spring-power is entirely unchecked. By applying still more power to the lever *l* the friction-strap can be brought to bear on the drum *i* with any desired force, and the motion of the spring-power can be checked or entirely stopped. If it is desired to retain the lever *l* in any desired position, it is made to catch in a notch-bar, *m*. (Best seen in Fig. 3.)

In cases where it is desirable to bring the mechanism suddenly to a stop, we attach a lug, *n*, to the lever *l*, which, when pressure of the foot is withdrawn from said lever *l*, will, by means of the spring *k* operating on the strap, be drawn in an interdental space of the wheel *c*, and bring the mechanism suddenly at rest.

This spring-power, it will be seen, is admirably adapted for driving sewing-machines or other small machines, and that by means of the treadle B the operator is enabled to keep up the operative power without being obliged to take the hands from the work being operated upon, and the speed obtained from the spring-power can be controlled as desired by the action of the foot on the lever *l*.

What we claim as our invention, and desire to secure by Letters Patent, is—

1. The treadle or foot-lever B, in combination with the winding-gear of a spring-power substantially as and for the purpose described.

2. The lever *l* and spring *k*, in combination with the friction-strap *j*, drum *i*, and spring power, substantially as set forth.

3. The pawl *f*, provided with the stop *h*, in combination with the spring *g*, substantially as herein specified.

ALBERT C. HALLAM.
JAMES W. McKEE.

Witnesses:
ROBT. SPROUL,
A. A. WOOLEY.